US012531184B2

(12) United States Patent
Oh

(10) Patent No.: US 12,531,184 B2
(45) Date of Patent: Jan. 20, 2026

(54) COIL COMPONENT

(71) Applicant: SAMSUNG ELECTRO-MECHANICS CO., LTD., Suwon-si (KR)

(72) Inventor: Jun Seok Oh, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 663 days.

(21) Appl. No.: 18/071,248

(22) Filed: Nov. 29, 2022

(65) Prior Publication Data

US 2023/0197334 A1 Jun. 22, 2023

(30) Foreign Application Priority Data

Dec. 21, 2021 (KR) ........................ 10-2021-0184077

(51) Int. Cl.

| | |
|---|---|
| ***H01F 27/32*** | (2006.01) |
| ***H01F 27/02*** | (2006.01) |
| ***H01F 27/28*** | (2006.01) |
| ***H01F 27/29*** | (2006.01) |
| ***H01F 27/30*** | (2006.01) |

(52) U.S. Cl.

CPC ........... *H01F 27/324* (2013.01); *H01F 27/02* (2013.01); *H01F 27/2828* (2013.01); *H01F 27/292* (2013.01); *H01F 27/30* (2013.01)

(58) Field of Classification Search

CPC .... H01F 27/324; H01F 27/02; H01F 27/2828; H01F 27/292; H01F 27/30

See application file for complete search history.

(56) References Cited

U.S. PATENT DOCUMENTS

| | | | | |
|---|---|---|---|---|
| 11,600,434 | B2 * | 3/2023 | Kim | H01F 27/292 |
| 2010/0219925 | A1 * | 9/2010 | Yamamoto | H01F 41/041 29/606 |
| 2016/0268038 | A1 * | 9/2016 | Choi | H01F 27/255 |
| 2018/0182537 | A1 * | 6/2018 | Shimizu | H01F 27/29 |
| 2018/0277296 | A1 * | 9/2018 | Endo | H01F 41/046 |
| 2019/0189338 | A1 * | 6/2019 | Kim | H01F 27/29 |
| 2019/0304671 | A1 * | 10/2019 | Yang | H01F 17/04 |
| 2019/0333679 | A1 * | 10/2019 | Lee | H01F 27/2804 |
| 2020/0020477 | A1 * | 1/2020 | Kang | H01F 17/0013 |

(Continued)

FOREIGN PATENT DOCUMENTS

| | | | |
|---|---|---|---|
| JP | 2007266487 A | * | 10/2007 |
| JP | 2012060013 A | * | 3/2012 |

(Continued)

*Primary Examiner* — Malcolm Barnes

(74) *Attorney, Agent, or Firm* — MORGAN, LEWIS & BOCKIUS LLP

(57) ABSTRACT

A coil component includes: a body having one surface, and opposite end surfaces facing each other while each being connected to the one surface; a coil unit disposed within the body; slit portions formed in edges at which the one surface of the body meets the opposite end surfaces of the body, respectively; first and second external electrodes disposed on the opposite end surfaces of the body, each thereof being connected to the coil unit, and extending to the one surface of the body through the slit portions, respectively; and a cover insulating layer covering each of the first and second external electrodes disposed on the opposite end surfaces of the body and on the slit portions.

19 Claims, 4 Drawing Sheets

1000

I-I'

B

(56) References Cited

U.S. PATENT DOCUMENTS

| | | | | |
|---|---|---|---|---|
| 2020/0035404 | A1* | 1/2020 | Lim | H01F 17/0013 |
| 2020/0098508 | A1* | 3/2020 | Park | H01F 17/0013 |
| 2020/0286674 | A1* | 9/2020 | Han | H01F 27/2804 |
| 2020/0350115 | A1* | 11/2020 | Kang | H01F 27/29 |
| 2020/0381170 | A1* | 12/2020 | Park | H01F 27/255 |
| 2021/0057138 | A1 | 2/2021 | Yang et al. | |
| 2021/0151248 | A1* | 5/2021 | Ohkubo | H01F 17/04 |
| 2021/0202157 | A1 | 7/2021 | Shin et al. | |

FOREIGN PATENT DOCUMENTS

| | | | |
|---|---|---|---|
| JP | 2018-107346 | A | 7/2018 |
| KR | 10-2138885 | B1 | 7/2020 |
| KR | 10-2248520 | B1 | 5/2021 |
| KR | 10-2021-0082829 | A | 7/2021 |

* cited by examiner

I-I'

B

COIL COMPONENT

CROSS-REFERENCE TO RELATED APPLICATION(S)

This application claims benefit of priority to Korean Patent Application No. 10-2021-0184077 filed on Dec. 21, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in an electronic device together with a resistor and a capacitor.

As electronic devices are increasingly improved in performance while their sizes become smaller, the number of electronic components used in electronic devices has increased, and the sizes of the electronic components have decreased.

When external electrodes are formed on surfaces of a body of a coil component through a plating process to reduce a size of the coil component, defects in appearance of the external electrodes may occur due to plating spread.

SUMMARY

An aspect of the present disclosure may provide a coil component having no defects in appearance of external electrodes.

Another aspect of the present disclosure may provide a coil component advantageous in terms of size reduction and integration by exposing external electrodes only to a mounting surface of the coil component.

According to an aspect of the present disclosure, a coil component may include: a body having one surface, and opposite end surfaces facing each other while each being connected to the one surface; a coil unit disposed within the body; slit portions formed in edges at which the one surface of the body meets the opposite end surfaces of the body, respectively; first and second external electrodes disposed on the opposite end surfaces of the body, each thereof being connected to the coil unit, and extending to the one surface of the body through the slit portions, respectively; and a cover insulating layer covering each of the first and second external electrodes disposed on the opposite end surfaces of the body and on the slit portions.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
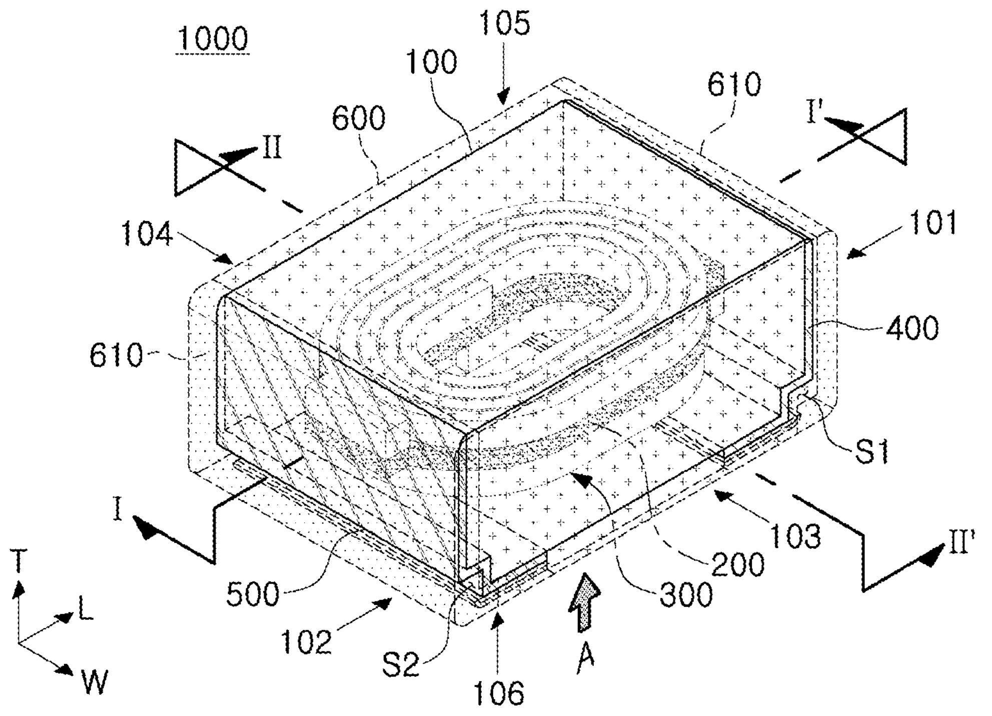
FIG. 1 is a schematic perspective view illustrating a coil component according to a first exemplary embodiment in the present disclosure.

Hereinafter, exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Various kinds of electronic components may be used in electronic devices, and various kinds of coil components may be appropriately used between these electronic components to remove noise or for other purposes.

That is, in the electronic devices, the coil components may be used as power inductors, high frequency (HF) inductors, general beads, high frequency (GHz) beads, common mode filters, and the like.

First Exemplary Embodiment

Figure 2:
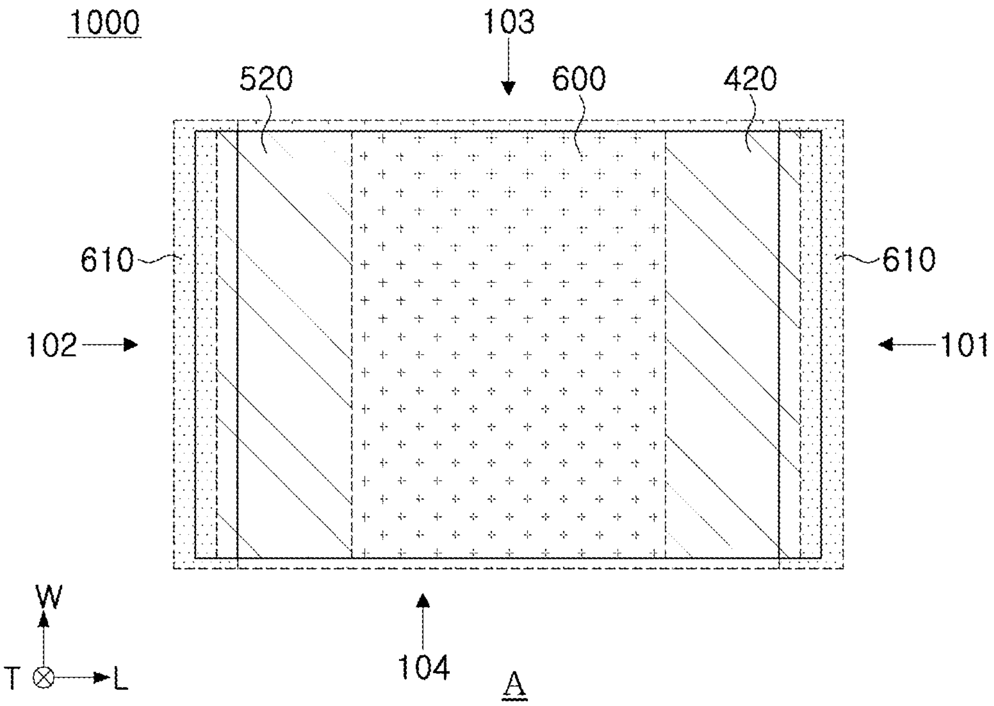
FIG. 2 is a bottom view of FIG. 1 when viewed in direction A.
Figure 3:
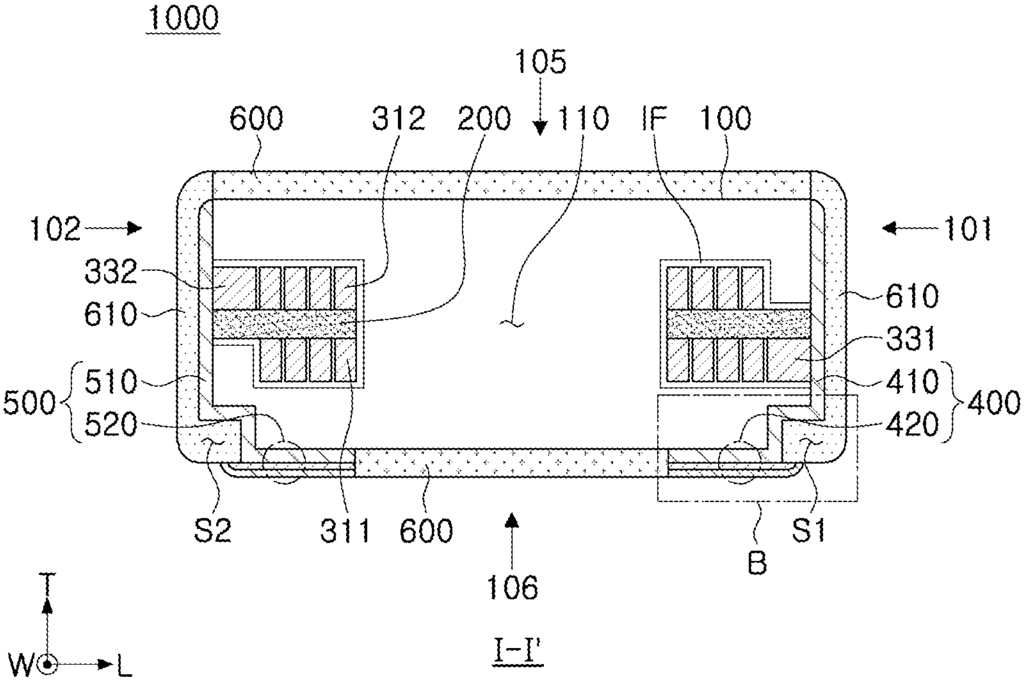
FIG. 3 is a cross-sectional view of FIG. 1 taken along line I-I'.
Figure 3:
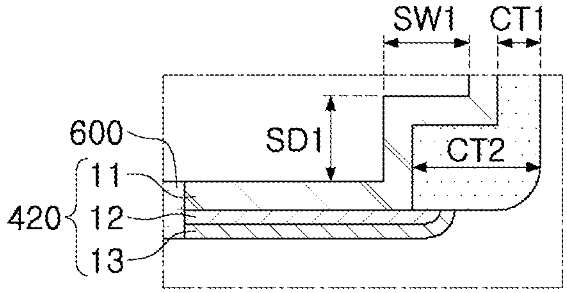
Figure 4:
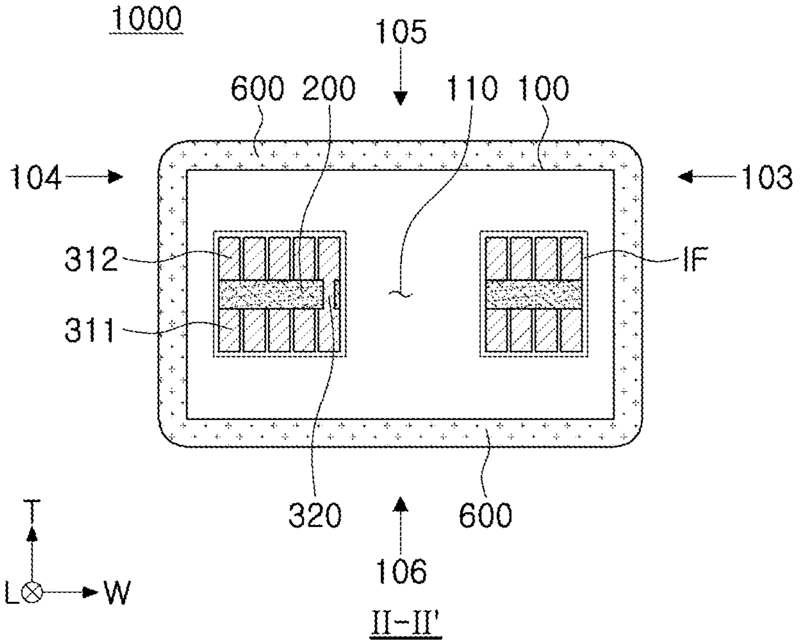
FIG. 4 is a cross-sectional view of FIG. 1 taken along line II-II'.

FIG. 1 is a schematic perspective view illustrating a coil component 1000 according to a first exemplary embodiment in the present disclosure. FIG. 2 is a bottom view of FIG. 1 when viewed in direction A. FIG. 3 is a cross-sectional view of FIG. 1 taken along line I-I'. FIG. 4 is a cross-sectional view of FIG. 1 taken along line II-II'.

Referring to FIGS. 1 through 4, the coil component 1000 according to the first exemplary embodiment in the present disclosure may include a body 100 having slit portions S1 and S2 formed therein, a coil unit 300, external electrodes 400 and 500, a surface insulating layer 600, and a cover insulating layer 610, and may further include a substrate 200.

The body 100 may form an appearance of the coil component 1000 according to the present exemplary embodiment, and the coil unit 300 may be embedded in the body 100.

The body 100 may generally have a hexahedral shape.

The first exemplary embodiment in the present disclosure will hereinafter be described on the assumption that the body 100 has a hexahedral shape as an example. However, the description herein does not exclude a coil component including a body formed in a shape other than the hexahedral shape from the scope of the present exemplary embodiment.

Referring to FIGS. 1 through 4, the body 100 may have a first surface 101 and a second surface 102 facing each other in the length direction L, a third surface 103 and a fourth surface 104 facing each other in the width direction W, and a fifth surface 105 and a sixth surface 106 facing each other in the thickness direction T. The first to fourth surfaces 101 to 104 of the body 100 may be wall surfaces of the body 100 that connect the fifth surface 105 and the sixth surface 106 of the body 100 to each other. Hereinafter, opposite end surfaces (one end surface and the other end surface) of the body 100 may refer to the first surface 101 and the second surface 102 of the body 100, respectively, and opposite side surfaces (one side surface and the other side surface) of the body 100 may refer to the third surface 103 and the fourth surface 104 of the body 100, respectively. In addition, one surface and the other surface of the body 100 may refer to the sixth surface 106 and the fifth surface 105 of the body 100, respectively. When the coil component 1000 according to the present exemplary embodiment is mounted on a mounting board such as a printed circuit board, one surface 106 of the body 100 may be disposed to face a mounting surface of the mounting board.

The body 100 may be formed so that the coil component 1000 according to the present exemplary embodiment in which the external electrodes 400 and 500, the surface insulating layer 600, and the cover insulating layer 610 to be described below are formed, for example, has a length of 2.5 mm, a width of 2.0 mm, and a thickness of 1.0 mm, has a length of 2.0 mm, a width of 1.2 mm, and a thickness of 0.65 mm, has a length of 1.6 mm, a width of 0.8 mm, and a thickness of 0.8 mm, has a length of 1.0 mm, a width of 0.5 mm, and a thickness of 0.5 mm, or has a length of 0.8 mm, a width of 0.4 mm, and a thickness of 0.65 mm, but is not limited thereto. Meanwhile, the above-described exemplary numerical values for the length, width, and thickness of the coil component 1000 refer to numerical values in which process errors are not reflected. Thus, numerical values including process errors in an allowable range may be considered to fall within the above-described exemplary numerical values.

Based on an image of a cross section of the coil component 1000 in the length direction L-thickness direction T taken at a central portion thereof in the width direction W using an optical microscope or a scanning electron microscope (SEM), the above-mentioned length of the coil component 1000 may refer to a maximum value among dimensions of a plurality of line segments spaced apart from each other in the thickness direction T, each connecting two outermost boundary lines facing each other in the length direction L of the coil component 1000 in parallel to the length direction L in the image. Alternatively, the length of the coil component 1000 may refer to a minimum value among the dimensions of the plurality of line segments described above. Alternatively, the length of the coil component 1000 may refer to an arithmetic mean value of at least three among the dimensions of the plurality of line segments described above. Here, the plurality of line segments parallel to the length direction L may be equally spaced apart from each other in the thickness direction T, but the scope of the present disclosure is not limited thereto.

Based on an image of a cross section of the coil component 1000 in the length direction L-thickness direction T taken at a central portion thereof in the width direction W using an optical microscope or a scanning electron microscope (SEM), the above-mentioned thickness of the coil component 1000 may refer to a maximum value among dimensions of a plurality of line segments spaced apart from each other in the length direction L, each connecting two outermost boundary lines facing each other in the thickness direction T of the coil component 1000 in parallel to the thickness direction T in the image. Alternatively, the thickness of the coil component 1000 may refer to a minimum value among the dimensions of the plurality of line segments described above. Alternatively, the thickness of the coil component 1000 may refer to an arithmetic mean value of at least three among the dimensions of the plurality of line segments described above. Here, the plurality of line segments parallel to the thickness direction T may be equally spaced apart from each other in the length direction L, but the scope of the present disclosure is not limited thereto.

Based on an image of a cross section of the coil component 1000 in the length direction L-width direction W taken at a central portion thereof in the thickness direction T using an optical microscope or a scanning electron microscope (SEM), the above-mentioned width of the coil component 1000 may refer to a maximum value among dimensions of a plurality of line segments spaced apart from each other in the length direction L, each connecting two outermost boundary lines facing each other in the width direction W of the coil component 1000 in parallel to the width direction W in the image. Alternatively, the width of the coil component 1000 may refer to a minimum value among the dimensions of the plurality of line segments described above. Alternatively, the width of the coil component 1000 may refer to an arithmetic mean value of at least three among the dimensions of the plurality of line segments described above. Here, the plurality of line segments parallel to the width direction W may be equally spaced apart from each other in the length direction L, but the scope of the present disclosure is not limited thereto.

Alternatively, each of the length, width, and thickness of the coil component 1000 may be measured by a micrometer measurement method. In the micrometer measurement method, each of the length, width, and thickness of the coil component 1000 may be measured by setting a zero point using a micrometer having gage repeatability and reproducibility (R&R), inserting the coil component 1000 according to the present exemplary embodiment between tips of the micrometer, and turning a measurement lever of the micrometer. Meanwhile, concerning the measurement of the length of the coil component 1000 by the micrometer measurement method, the length of the coil component 1000 may refer to a value measured once, or may refer to an arithmetic mean of values measured multiple times. The same may also be applied to the width and the thickness of the coil component 1000.

The body 100 may include a magnetic material and a resin. Specifically, the body 100 may be formed by stacking one or more magnetic composite sheets in which the magnetic material is dispersed in the resin. However, the body 100 may also have a structure other than the structure in which the magnetic material is dispersed in the resin. For example, the body 100 may be made of a magnetic material such as ferrite, or may be made of a non-magnetic material.

The magnetic material may be ferrite or metal magnetic powder.

The ferrite may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, and Fe—Cr—Al-based alloy powder.

The metal magnetic powder may be amorphous or crystalline. For example, the metal magnetic powder may be Fe—Si—B—Cr-based amorphous alloy powder, but is not necessarily limited thereto.

Each of the ferrite and the metal magnetic powder may have an average particle diameter of about 0.1 μm to 30 μm, but is not limited thereto.

The body 100 may include two or more types of magnetic materials dispersed in the resin. Here, the different types of magnetic materials mean that the magnetic materials dispersed in the resin are distinguished from each other in terms of any one of average particle diameter, composition, crystallinity, and shape.

The resin may include an epoxy, a polyimide, a liquid crystal polymer (LCP), or a mixture thereof, but is not limited thereto.

The body 100 may include a core 110 penetrating through the coil unit 300 to be described below. The core 110 may be formed by filling a through hole of the coil unit 300 with the magnetic composite sheets, but is not limited thereto.

Referring to FIGS. 1 through 4, in the coil component 1000 according to the present exemplary embodiment, the slit portions S1 and S2 may be formed in the body 100.

The slit portions S1 and S2 may be formed in edge regions of the sixth surface 106 of the body 100.

Specifically, each of the slit portions S1 and S2 may be formed along an edge between each of the first and second surfaces 101 and 102 of the body 100 and the sixth surface 106 of the body 100. That is, the first slit portion S1 may be formed along an edge between the first surface 101 of the body 100 and the sixth surface 106 of the body 100, and the second slit portion S2 may be formed along an edge between the second surface 102 of the body 100 and the sixth surface 106 of the body 100. The slit portions S1 and S2 may extend from the third surface 103 to the fourth surface 104 of the body 100. Meanwhile, the slit portions S1 and S2 may not extend to the fifth surface 105 of the body 100. That is, the slit portions S1 and S2 may not penetrate through the body 100 in the thickness direction T of the body 100.

At a coil bar level before coil components are individualized, the slit portions S1 and S2 may be formed by performing a pre-dicing process on one surface of the coil bar along virtual boundary lines coinciding with the width direction of the coil components among virtual boundary lines for individualizing the coil components.

The slit portions S1 and S2 may have inner surfaces including inner walls substantially parallel to the first and second surfaces 101 and 102 of the body 100, and lower surfaces connecting the inner walls to the first and second surfaces 101 and 102 of the body 100. Meanwhile, each of the slit portions S1 and S2 will hereinafter be described as having an inner wall and a lower surface for convenience of description, but the scope of the present disclosure is not limited thereto. For example, in the cross section of the coil component in the longitudinal direction L-thickness direction T, the inner surface of the first slit portion S1 may be formed to have a curved shape to connect the first surface 101 and the sixth surface 106 of the body 100, and the inner wall and the lower surface described above may not be distinguished from each other.

Meanwhile, the inner surfaces of the slit portions S1 and S2 also belong to the surfaces of the body 100, but in the present specification, the inner surfaces of the slit portions S1 and S2 are distinguished from the surfaces of the body 100, i.e., the first to sixth surfaces 101 to 106 of the body 100, for convenience of understanding and explanation of the present disclosure.

Referring to FIG. 3, a width SW1 and a depth SD1 of each of the slit portions S1 and S2 may be adjusted within a range in which the slit portions S1 and S2 are spaced apart from the substrate 200 and the coil unit 300 to be described below. That is, the slit portions S1 and S2 are configured to be spaced apart from lead-out portions 331 and 332, which are end portions of the coil unit 300 exposed to the surfaces of the body 100.

A mean depth SD1 of each of the slit portions S1 and S2 may be 30 μm or more and 80 μm or less. That is, a mean step difference between the sixth surface 106 of the body 100 and the lower surface of each of the slit portions S1 and S2 may be 30 μm or more and 80 μm or less. In some embodiments, the mean depth SD1 of each of the slit portions S1 and S2 may be more than 29 μm and 82 μm or less.

When the mean depth SD1 of each of the slit portions S1 and S2 is less than 30 μm or 29 μm or less, a plating spread prevention effect may decrease in a plating process for forming the external electrodes 400 and 500 to be described below. In addition, when the mean depth SD1 of each of the slit portions S1 and S2 is more than 80 μm or more than 82 μm, the cover insulating layer 610 to be described below may not be sufficiently filled in the slit portions S1 and S2, and as a result, plating spread defects may increase back in a plating process for forming the external electrodes 400 and 500.

TABLE 1

| Experimental example | Depth (μm) of slit portion | Plating spread area (%) ((plating spread area/W − T surface area) × 100) | Whether reference value for prevention of plating spread is satisfied (Satisfied: OK/Unsatisfied: NG) |
|---|---|---|---|
| #1 | 13.1 | 8.95 | NG |
| #2 | 22.8 | 5.17 | NG |
| #3 | 29.3 | 0.75 | OK |
| #4 | 38.9 | 0.27 | OK |
| #5 | 52.6 | 0.31 | OK |
| #6 | 63.8 | 0.45 | OK |
| #7 | 74.7 | 0.19 | OK |
| #8 | 82.0 | 0.21 | OK |
| #9 | 95.5 | 2.13 | NG |

Table 1 shows experimental data indicating a change in ratio of a plating spread area to a total W-T surface area measured by adjusting a mean depth SD1 of the slit portion with respect to the coil component 1000 according to the present exemplary embodiment.

Referring to Table 1, it was determined that a plating spread defect occurred when an area of a region where plating spread occurred was 2% or more of the total W-T surface area of the coil component 1000, and it was confirmed that the ratio of the plating spread area to the total W-T surface area was more than 2% in Experimental Examples #1 and #2 in which the mean depth SD1 of each of the slit portions S1 and S2 was less than about 30 μm.

In addition, in Experimental Example #9 in which the mean depth SD1 of each of the slit portions S1 and S2 was more than about 80 μm, it was confirmed that the ratio of the plating spread area to the total W-T surface area increased back to more than 2%.

Therefore, in the coil component 1000 according to the present exemplary embodiment, when the mean depth SD1 of each of the slit portions is 30 μm or more and 80 μm or less, the plating spread prevention effect may satisfy the reference value.

Here, based on an image of a cross section of the coil component 1000 in the length direction L-thickness direction T taken at a central portion thereof in the width direction W using an optical microscope or a scanning electron microscope (SEM), the mean depth SD1 of each of the slit portions S1 and S2 may refer to an arithmetic mean value of at least three among dimensions of a plurality of line segments spaced apart from each other in the length direction L, each connecting an extension line of an outermost boundary line of the lower surface of each of the slit portions S1 and S2 to an outermost boundary line of the sixth surface 106 of the body 100 in parallel to the thickness direction T in the image. Here, the plurality of line segments parallel to the thickness direction T may be equally spaced apart from each other in the length direction L, but the scope of the present disclosure is not limited thereto.

In addition, the ratio of the plating spread area to the total W-T surface area may be calculated using an Image J program tool, for example, based on an image of the coil component 1000 in the width direction W-thickness direction T captured by an optical microscope or a scanning electron microscope (SEM) at an end thereof in the length direction L at a magnification of 100 times to 1000 times, but the scope of the present disclosure is not limited thereto.

The substrate 200 may be disposed inside the body 100. The substrate 200 may be configured to support the coil unit 300 to be described below. Side surfaces of the substrate 200 may be exposed to the first and second surfaces 101 and 102 of the body 100 to contact the first and second external electrodes 400 and 500, respectively.

The substrate 200 may be formed of an insulating material including a thermosetting insulating resin such as an epoxy resin, a thermoplastic insulating resin such as a polyimide resin, or a photosensitive insulating resin, or may be formed of an insulating material in which a reinforcing material such as a glass fiber or a filler is impregnated in such an insulating resin. As an example, the substrate 200 may be formed of an insulating material such as prepreg, an Ajinomoto build-up film (ABF), FR-4, a bismaleimide triazine (BT) resin, or a photoimageable dielectric (PID), but is not limited thereto.

The filler may be at least one selected from the group consisting of silica ($SiO_2$), alumina ($Al_2O_3$), silicon carbide (SiC), barium sulfate ($BaSO_4$), talc, clay, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the substrate 200 is formed of an insulating material including a reinforcing material, the substrate 200 may provide more excellent rigidity. When the substrate 200 is formed of an insulating material including no glass fiber, this may be advantageous in decreasing a thickness of the coil component 1000 according to the present exemplary embodiment. In addition, based on the body 100 of the same size, the substrate 200 formed of an insulating material including no glass fiber makes it possible to increase a volume occupied by the coil unit 300 and/or the magnetic metal powder, thereby improving component characteristics. When the substrate 200 is formed of an insulating material including a photosensitive insulating resin, the number of processes for forming the coil unit 300 may decrease, which is advantageous in decreasing a production cost and in forming a fine via 320.

The substrate 200 may have a thickness of, for example, 10 μm or more and 50 μm or less, but is not limited thereto.

The coil unit 300 may be disposed inside the body 100 to exhibit characteristics of the coil component. For example, when the coil component 1000 according to the present exemplary embodiment is utilized as a power inductor, the coil unit 300 may serve to stabilize power of an electronic device by storing an electric field as a magnetic field and maintaining an output voltage.

Referring to FIGS. 1 through 4, the coil unit 300 may include coil patterns 311 and 312, lead-out portions 331 and 332, and a via 320. Specifically, based on the directions of FIGS. 3 and 4, a first coil pattern 311 and a first lead-out portion 331 may be disposed on a lower surface of the substrate 200 facing the sixth surface 106 of the body 100, and a second coil pattern 312 and a second lead-out portion 332 may be disposed on an upper surface of the substrate 200 facing the lower surface of the substrate 200. The first coil pattern 311 may be connected in contact with the first lead-out portion 331 on the lower surface of the substrate 200. The second coil pattern 312 may be connected in contact with the second lead-out portion 332 on the upper surface of the substrate 200, and the via 320 may be connected in contact with respective inner ends of the first coil pattern 311 and the second coil pattern 312 by penetrating through the substrate 200. In this way, the coil unit 300 may function as a single coil as a whole.

Each of the first coil pattern 311 and the second coil pattern 312 may have a planar spiral shape in which at least one turn is formed around the core 110. As an example, the first coil pattern 311 may form at least one turn around the core 110 on the lower surface of the substrate 200.

The lead-out portions 331 and 332 may be exposed to (or extend from) the first and second surfaces 101 and 102 of the body 100, respectively. That is, the first lead-out portion 331 may be exposed to the first surface 101 of the body 100, and the second lead-out portion 332 may be exposed to the second surface 102 of the body 100.

Meanwhile, since the lead-out portions 331 and 332 are configured to be spaced apart from the slit portions S1 and S2, the lead-out portions 331 and 332 may not be exposed to the inner walls and the lower surfaces of the slit portions S1 and S2.

At least one of the coil patterns 311 and 312, the via 320, and the lead-out portions 331 and 332 may include at least one metal layer. For example, based on the directions of FIGS. 3 and 4, when the second coil pattern 312, the via 320, and the second lead-out portion 332 are formed on the upper surface of the substrate 200 by plating, each of the second coil pattern 312, the via 320, and the second lead-out portion 332 may include a seed layer such as an electroless plating layer and an electrolytic plating layer. Here, the electrolytic plating layer may have a single-layer structure or have a multi-layer structure. The electrolytic plating layer having the multi-layer structure may be formed in a conformal film structure in which one electrolytic plating layer covers another electrolytic plating layer, or may be formed by stacking one electrolytic plating layer on only one surface of another electrolytic plating layer. The seed layer of the second coil pattern 312, the seed layer of the via 320, and the seed layer of the second lead-out portion 332 may be integrally formed, such that no boundaries are formed therebetween, but are not limited thereto. The electrolytic plating layer of the second coil pattern 312, the electrolytic plating layer of the via 320, and the electrolytic plating layer of the second lead-out portion 332 may be integrally formed, such that no boundaries are formed therebetween, but are not limited thereto.

Each of the coil patterns 311 and 312, the via 320, and the lead-out portions 331 and 332 may be formed of a conductive material such as copper (Cu), aluminum (Al), silver (Ag), tin (Sn), gold (Au), nickel (Ni), lead (Pb), titanium (Ti), chromium (Cr), molybdenum (Mo), or an alloy thereof, but is not limited thereto. As an example, the first coil pattern 311 may include a seed layer including copper (Cu) in contact with the substrate 200, and an electrolytic plating layer disposed on the seed layer and including copper (Cu), but the scope of the present disclosure is not limited thereto.

An insulating film IF may be disposed between the coil unit 300 and the body 100 and between the substrate 200 and the body 100.

Referring to FIGS. 3 and 4, the insulating film IF may formed along the surfaces of the substrate 200 on which the first and second coil patterns 311 and 312 and the first and second lead-out portions 331 and 332 are formed, but is not limited thereto. The insulating film IF may be filled between adjacent turns of each of the first and second coil patterns 311 and 312, between the first lead-out portion 331 and the first coil pattern 311, and between the second lead-out portion 332 and the second coil pattern 312 for insulation between coil turns.

The insulating film IF may be provided to insulate the coil unit 300 and the body 100 from each other, and may include a known insulating material such as parylene, but is not limited thereto. As another example, the insulating film IF may include an insulating material such as an epoxy resin rather than parylene. The insulating film IF may be formed by a vapor deposition method, but is not limited thereto. As another example, the insulating film IF may be formed by stacking insulation films for forming the insulating film IF on both surfaces of the substrate 200 on which the coil unit 300 is formed and then curing the insulation films, or may be formed by applying an insulation paste for forming the insulating film IF onto both surfaces of the substrate 200 on which the coil unit 300 is formed and then curing the insulation paste. Meanwhile, the insulating film IF may be omitted in the present exemplary embodiment for the above-described reason. That is, if the body 100 has a sufficient electrical resistance at an operating current and voltage designed for the coil component 1000 according to the present exemplary embodiment, the insulating film IF may be omitted in the present exemplary embodiment.

The external electrodes 400 and 500 may be spaced apart from each other on one surface 106 of the body 100, each thereof being connected to the coil unit 300. Specifically, in the present exemplary embodiment, the first external electrode 400 may include a first connection portion 410 disposed on the first surface 101 of the body 100 and connected in contact with the first lead-out portion 331, and a first pad portion 420 extending from the first connection portion 410 to the sixth surface 106 of the body 100. The second external electrode 500 may include a second connection portion 510 disposed on the second surface 102 of the body 100 and connected in contact with the second lead-out portion 332, and a second pad portion 520 extending from the second connection portion 510 to the sixth surface 106 of the body 100.

Referring to FIG. 2, the first and second pad portions 420 and 520 may be disposed to be spaced apart from each other on the sixth surface 106 of the body 100. The surface insulating layer 600 to be described below may be disposed in a region between the first and second pad portions 420 and 520 on the sixth surface 106 of the body 100.

The external electrodes 400 and 500 may be formed on the surfaces of the body 100 by performing electrolytic plating using the surface insulating layer 600 formed on the surfaces of the body 100, which will be described below, as a plating resist. When the body 100 includes magnetic metal powder, the magnetic metal powder may be exposed to the surfaces of the body 100. The magnetic metal powder exposed to the surfaces of the body 100 may impart conductivity to the surfaces of the body 100 during electrolytic plating, and the external electrodes 400 and 500 may be formed on the surfaces of the body 100 by electrolytic plating.

The connecting portions 410 and 510 and the pad portions 420 and 520 of the external electrodes 400 and 500 may be formed by the same plating process, such that no boundaries are formed therebetween. That is, the first connection portion 410 and the first pad portion 420 may be integrally formed with each other, and the second connection portion 510 and the second pad portion 520 may be integrally formed with each other. In addition, the connecting portions 410 and 510 and the pad portions 420 and 520 may be made of the same metal. However, the description herein does not exclude, from the scope of the present disclosure, a case in which the connection portions 410 and 510 and the pad portions 420 and 520 are formed by different plating processes and boundaries are formed therebetween.

Referring to FIG. 3, each of the external electrodes 400 and 500 in the coil component 1000 according to the present exemplary embodiment may be formed in a plurality of layers. For example, the first external electrode 400 may include a first metal layer 11, a second metal layer 12 disposed on the first metal layer 11, and a third metal layer 13 disposed on the second metal layer, and the first connection portion 410 and the first pad portion 420 described above may refer to the first metal layer 11. Thus, the second and third metal layers 12 and 13 may be disposed only on the first pad portion 420 and may not extend to the first connection portion 410. However, the scope of the present exemplary embodiment is not limited thereto.

Meanwhile, the first metal layer 11 may be integrally disposed on each of the first and second surfaces 101 and 102 of the body 100, each of the inner surfaces of the slit portions S1 and S2, and the sixth surface 106 of the body 100. Specifically, the first metal layer 11 of the first external electrode 400 may be disposed on the first surface 101 of the body 100 and extend along the lower surface and the inner wall of the slit portion S1 and the sixth surface 106 of the body 100. Also, the first metal layer 11 of the second external electrode 500 may be disposed on the second surface 102 of the body 100 and extend along the lower surface and the inner wall of the slit portion S2 and the sixth surface 106 of the body 100.

The external electrodes 400 and 500 may be formed of a conductive material such as copper (Cu), aluminum (Al), silver (Ag), tin (Sn), gold (Au), nickel (Ni), lead (Pb), titanium (Ti), or an alloy thereof, but are not limited thereto.

Each of the external electrodes 400 and 500 may be formed in a plurality of layers. For example, the first external electrode may include a first metal layer 11 including copper (Cu), a second metal layer 12 disposed on the first metal layer 11 and including nickel (Ni), and a third metal layer 13 disposed on the second metal layer 12 and including tin (Sn).

In the coil component 1000 according to the present exemplary embodiment, after the first metal layer 11 is disposed, the cover insulating layer 610 to be described below may be disposed, and then the second and third metal layers 12 and 13 may be additionally disposed, such that the cover insulating layer 610 filling each of the slit portions S1 and S2 functions as a plating resist, thereby suppressing plating spread to the first surface 101 or the second surface 102 of the body 100, that is, the W-T surface of the body 100, at the time of forming the second and third metal layers 12 and 13. In some embodiments, along a thickness direction of the coil component 1000, the first metal layer 11 disposed on at least one of the slit portions S1 and S2 may overlap the cover insulating layer 610 and the second metal layer 12, in order. In some embodiments, a portion of the second metal layer 12 may be disposed on the cover insulating layer 610. In some embodiments, the third metal layer 13 may be disposed on the cover insulating layer 610.

The external electrodes 400 and 500 may be formed by applying a conductive paste including a conductive powder including at least one of copper, silver, and tin and a thermosetting resin, and then curing the conductive paste. Alternatively, the external electrodes 400 and 500 may be formed by a plating method, a vapor deposition method such as sputtering, or the like.

The surface insulating layer 600 may electrically protect the coil component, reduce a leakage current, and function as a plating resist at the time of forming the external electrodes 400 and 500 by plating.

Referring to FIGS. 1 through 4, the surface insulating layer 600 may be disposed on the surfaces of the body 100.

Specifically, the surface insulating layer 600 may be disposed on the third to sixth surfaces 103 to 106 of the body 100, except for regions in which the external electrodes 400 and 500 are disposed. The surface insulating layer 600 may function as a plating resist at the time of forming at least some of each of the external electrodes 400 and 500 by plating, but is not limited thereto.

The surface insulating layer 600 may be integrally formed on the surfaces of the body 100, or boundaries of the surface insulating layer 600 may be formed between the surfaces of the body 100. As a non-limiting example, surface insulating layers 600 formed on the fifth and sixth surfaces 105 and 106 of the body 100 and surface insulating layers 600 formed on the third and fourth surfaces 103 and 104 of the body 100 may be formed in different processes, and thus, boundaries may be formed therebetween.

The surface insulating layer 600 may include a thermoplastic resin such as polystyrene, vinyl acetate, polyester, polyethylene, polypropylene, polyamide, rubber, or acryl, a thermosetting resin such as phenol, epoxy, urethane, melamine, or alkyd, a photosensitive resin, parylene, $SiO_x$, or $SiN_x$.

The surface insulating layer 600 may have an adhesive function. For example, when the surface insulating layer 600 is formed by stacking an insulation film on the body 100, the insulation film may include an adhesive ingredient to adhere to surfaces of the body 100. In this case, an adhesive layer may be separately formed on one surface of the surface insulating layer 600 that contacts the body 100. However, a separate adhesive layer may not be formed on one surface of the surface insulating layer 600, for example, in a case where the surface insulating layer 600 is formed using an insulation film in a semi-cured (B-stage) state.

The surface insulating layer 600 may be formed by applying a liquid-phase insulating resin onto the surfaces of the body 100, applying an insulating paste onto the surfaces of the body 100, stacking an insulation film on the surfaces of the body 100, or forming an insulating resin on the surfaces of the body 100 by vapor deposition. The insulation film may be a dry film (DF) including a photosensitive insulating resin, an Ajinomoto build-up film (ABF) including no photosensitive insulating resin, a polyimide film, or the like.

The surface insulating layer 600 may be formed to have a thickness in a range of 10 nm to 100 μm. When the thickness of the surface insulating layer 600 is less than 10 nm, the characteristics of the coil component may decrease, such as a decrease in Q factor, a decrease in breakdown voltage, and a decrease in self-resonant frequency (SRF). When the thickness of the surface insulating layer 600 is more than 100 μm, an entire length, width, and thickness of the coil component may increase, which is disadvantageous in reducing the thickness of the coil component.

The cover insulating layer 610 may be disposed on the first and second surfaces 101 and 102 of the body 100, respectively, to cover the connection portions 410 and 510 of the first and second external electrodes 400 and 500 disposed on the first and second surfaces 101 and 102 of the body and in the slit portions S1 and S2. By covering the connection portions 410 and 510 of the first and second external electrodes 400 and 500, the cover insulating layer 610 may prevent the coil component 1000 according to the present exemplary embodiment from being short-circuited with another electronic component mounted adjacent thereto when the coil component 1000 is mounted on a mounting board such as a printed circuit board.

Referring to FIG. 3, the cover insulating layer 610 may cover the first metal layers 11 of the connection portions 410 and 510 disposed along the inner walls and the lower surfaces of the slit portions S1 and S2. For example, the cover insulating layer 610 may include a first region covering the first metal layer 11 disposed on the first surface 101 of the body 100, and a second region covering the first metal layer 11 disposed along the inner wall and the lower surface of the slit portion S1.

Since the cover insulating layer 610 is disposed to fill the second region, a mean thickness CT2 of the cover insulating layer 610 in the second region may be thicker than a mean thickness CT1 of the cover insulating layer 610 in the first region.

Here, based on an image of a cross section of the coil component 1000 in the length direction L-thickness direction T taken at a central portion thereof in the width direction W using an optical microscope or a scanning electron microscope (SEM), the mean thickness of the cover insulating layer 610 in each region may refer to an arithmetic mean value of at least three among dimensions of a plurality of line segments spaced apart from each other in the thickness direction T, each connecting outermost boundary lines facing each other in the length direction L of the cover insulating layer 610 in parallel to the length direction L in the image. Here, the plurality of line segments parallel to the length direction L may be equally spaced apart from each other in the thickness direction T, but the scope of the present disclosure is not limited thereto.

In the coil component 1000 according to the present exemplary embodiment, since the cover insulating layer 610 is formed to be thicker in the second region, which is a space generated by forming the slit portions S1 and S2, than in the first region as described above, after the first metal layers 11 are formed to be connected to the lead-out portions 331 and 332, the cover insulating layer 610 may function as plating resists at the time of additional plating for forming the second and third metal layers 12 and 13 for the pad portions 420 and 520.

Accordingly, it is possible to suppressing plating spread to the first surface 101 or the second surface 102 of the body 100, that is, the W-T surface of the body 100, at the time of performing a plating process for forming the second and third metal layers 12 and 13 of the pad portions 420 and 520.

The cover insulating layer 610 may include a thermoplastic resin such as polystyrene, vinyl acetate, polyester, polyethylene, polypropylene, polyamide, rubber, or acryl, a thermosetting resin such as phenol, epoxy, urethane, melamine, or alkyd, a photosensitive resin, parylene, $SiO_x$, or $SiN_x$.

The cover insulating layer 610 may have an adhesive function. For example, when the cover insulating layer 610 is formed by stacking an insulation film on the body 100, the insulation film may include an adhesive ingredient. In this case, an adhesive layer may be separately formed on one surface of the cover insulating layer 610. However, a separate adhesive layer may not be formed on one surface of the cover insulating layer 610, for example, in a case where the cover insulating layer 610 is formed using an insulation film in a semi-cured (B-stage) state.

The cover insulating layer 610 may be formed by forming an insulating resin on the first and second surfaces 101 and 102 of the body 100, for example, by applying a liquid-phase insulating resin onto the surfaces of the body 100 or by stacking an insulation film on the surfaces of the body 100. The insulation film may be a dry film (DF) including a photosensitive insulating resin, an Ajinomoto build-up film (ABF) including no photosensitive insulating resin, a polyimide film, or the like.

Second Exemplary Embodiment

Figure 5:
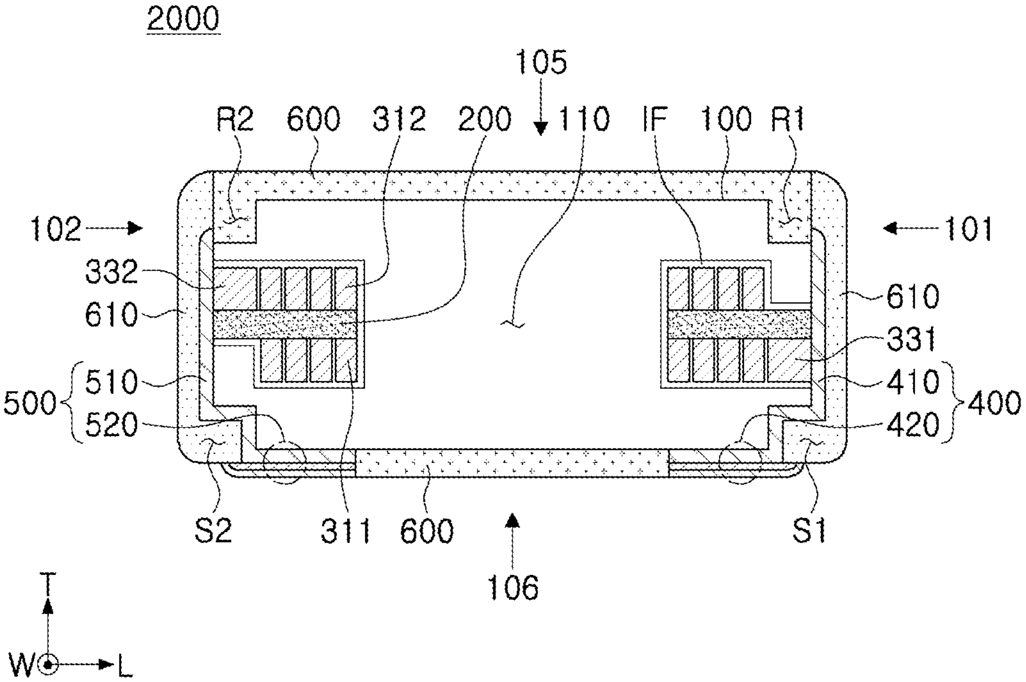
FIG. 5 is a view illustrating a coil component according to a second exemplary embodiment in the present disclosure, and corresponding to FIG. 3.

FIG. 5 is a view illustrating a coil component 2000 according to a second exemplary embodiment in the present disclosure, and corresponding to FIG. 3.

Upon comparing FIG. 5 with FIG. 3, the coil component 2000 according to the present exemplary embodiment is different from the coil component 1000 according to the first exemplary embodiment in the present disclosure in that the fifth surface 105 of the body 100 includes recess portions R1 and R2 formed at edges thereof contacting the first surface 101 and the second surface 102, respectively. Thus, in describing the coil component 2000 according to the present exemplary embodiment, only the recess portions R1 and R2, and the surface insulating layer 600, the cover insulating layer 610, and the connection portions 410 and 510 disposed adjacent thereto, which are different from those in the first exemplary embodiment in the present disclosure, will be described. Concerning the other configuration of the present exemplary embodiment, what has been described above for the first exemplary embodiment in the present disclosure may be identically applied thereto.

Referring to FIG. 5, in the coil component 2000 according to the present exemplary embodiment, a first recess portion R1 may be formed at an edge where the first surface 101 and the fifth surface 105 of the body 100 contact each other, and a second recess portion R2 may be formed at an edge where the second surface 102 and the fifth surface 105 of the body 100 contact each other. The recess portions R1 and R2 may extend from the third surface 103 to the fourth surface 104 of the body.

The recess portions R1 and R2 are configured to function to prevent plating spread to the fifth surface 105 of the body 100 during a plating process for forming the external electrodes 400 and 500.

Referring to FIG. 5, at least portions of the surface insulating layer 600 may be disposed in the recess portions R1 and R2. When the surface insulating layer 600 is formed on the body 100 in which the recess portions R1 and R2 are formed, the surface insulating layer 600 may fill the recess portions R1 and R2. The surface insulating layer 600 filled in the recess portions R1 and R2 may function as plating resists at the time of performing a plating process for forming the external electrodes 400 and 500 on the first and second surfaces 101 and 102 of the body 100, thereby preventing plating spread to the fifth surface 105 of the body 100.

Referring to FIG. 5, the recess portions R1 and R2 may suppress plating growth of the connection portions 410 and 510 in the thickness direction (T direction) on the first and second surfaces 101 and 102 of the body 100, thereby increasing a thickness of the cover insulating layer 610 covering upper ends of the connection portions 410 and 510. Therefore, at the time of the plating process for forming the connection portions 410 and 510 of the external electrodes 400 and 500, it is possible to suppress plating spread to the fifth surface 105 of the body 100.

The recess portions R1 and R2 may have a similar shape to the slit portions S1 and S2 described above, but are not limited thereto. That is, the recess portions R1 and R2 may have an angulated shape with each having an inner wall and an upper surface as illustrated in FIG. 5, or may have an arc-like concave shape.

When the recess portions R1 and R2 are formed through the pre-dicing process, a different surface roughness may be formed in the recess portions R1 and R2 along a dicing tip, thereby enhancing bonding strength with respect to the surface insulating layer 600.

Third Exemplary Embodiment

Figure 6:
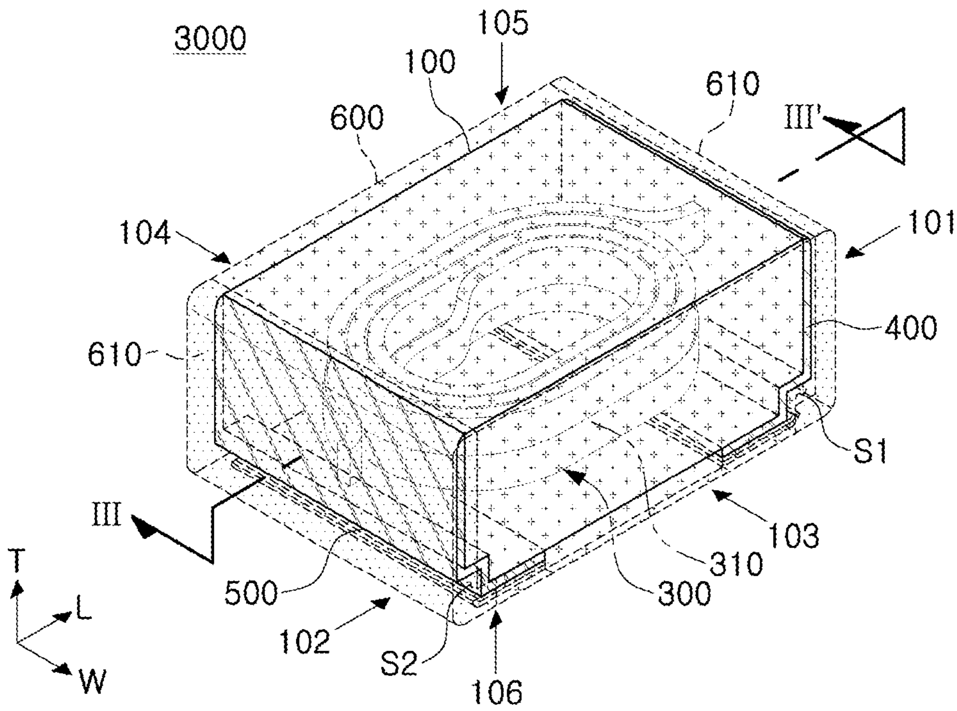
FIG. 6 is a schematic perspective view illustrating a coil component according to a third exemplary embodiment in the present disclosure.
Figure 7:
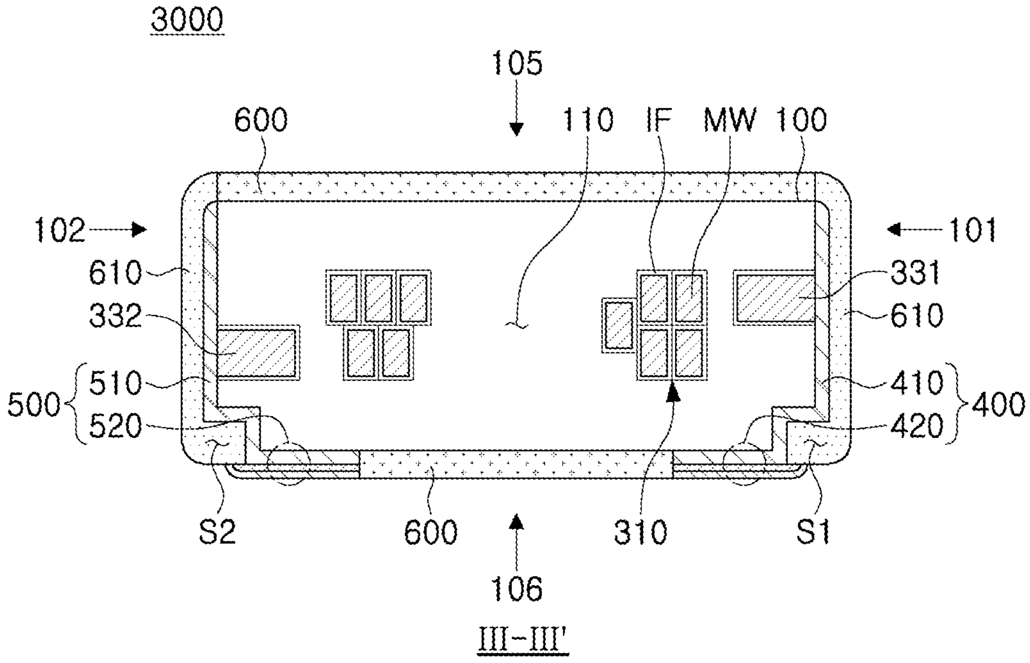
FIG. 7 is a cross-sectional view of FIG. 6 taken along line III-III'.

FIG. 6 is a schematic perspective view illustrating a coil component 3000 according to a third exemplary embodiment in the present disclosure. FIG. 7 is a cross-sectional view of FIG. 6 taken along line III-III'.

Upon comparing FIGS. 6 and 7 with FIGS. 1 through 4, the coil component 3000 according to the present exemplary embodiment is different from the coil component 1000 according to the first exemplary embodiment in the present disclosure in the configuration of the coil unit 300 because the substrate 200 is omitted. Thus, in describing the coil component 3000 according to the present exemplary embodiment, only the coil unit 300, which is different from that in the first exemplary embodiment in the present disclosure, will be described. Concerning the other configuration of the present exemplary embodiment, what has been described above for the first exemplary embodiment in the present disclosure may be identically applied thereto.

Referring to FIGS. 6 and 7, the coil unit 300 may be a wire-wound type coil formed by winding a wire material in a spiral shape, the wire material including a metal wire MW such as a copper wire and an insulating film IF coating a surface of the metal wire MW.

The coil unit 300 may include a wound portion 310 forming at least one turn around the core 110, and lead-out portions 331 and 332 extending from opposite ends of the wound portion 310, respectively, to be exposed to the first and second surfaces 101 and 102 the body 100, respectively.

The first lead-out portion 331 may extend from one end of the wound portion 310 to be exposed to the first surface 101 of the body 100, and the second lead-out portion 332 may extend from the other end of the wound portion 310 to be exposed to the second surface 102 of the body 100.

The wound portion 310 may be formed by winding the above-described wire material in the spiral shape. Referring to FIG. 7, in an L-T cross section of the coil component 3000 according to the present exemplary embodiment, a surface of each turn of the wound portion 310 may be coated with the insulating film IF. The wound portion 310 may be formed in one or more layers. Each of the layers in the wound portion 310 may be formed in a planar spiral shape, and may be wound with at least one turn.

The lead-out portions 331 and 332 may be integrally formed with the wound portion 310. For example, the wound portion 310 may be formed by winding the above-described wire material, and the lead-out portions 331 and 332 may be regions in which the wire material extends from the wound portion 310.

The metal wire MW may be formed of a conductive material such as copper (Cu), aluminum (Al), silver (Ag), tin (Sn), gold (Au), nickel (Ni), lead (Pb), titanium (Ti), chromium (Cr), molybdenum (Mo), or an alloy thereof, but is not limited thereto.

The insulating film IF may include an insulating material such as enamel, paralin, epoxy, or polyimide. The insulating film IF may be formed in two or more layers. As a non-limiting example, the insulating film IF may include a coating layer contacting the metal wire MW, and a fusion layer formed on the coating layer. The fusion layer constituting a turn of the metal wire MW as a wire material after being wound in a coil shape may be joined to the fusion layer constituting an adjacent turn of the metal wire MW by heat and pressure. When the metal wire MW including the insulating film IF is wound in such a structure, fusion layers of a plurality of turns in the wound portion 310 may be fused to and integrally formed with each other.

Meanwhile, although it is illustrated in FIGS. 6 and 7 that the coil unit 300 of the present exemplary embodiment is wound in an alpha type, the scope of the present exemplary embodiment is not limited thereto, and the coil unit 300 may be wound in an edge-wise type.

As set forth above, according to the exemplary embodiments in the present disclosure, it is possible to prevent an appearance defect and a short circuit, which are caused by plating spread of the external electrodes.

In addition, according to the exemplary embodiments in the present disclosure, the external electrodes can be exposed only to the mounting surface, thereby making it possible to provide a coil component that is advantageous in size reduction and integration.

While exemplary embodiments have been shown and described above, it will be apparent to those skilled in the art that modifications and variations could be made without departing from the scope of the present invention as defined by the appended claims.

What is claimed is:

1. A coil component comprising:

a body having one surface, and opposite end surfaces facing each other while each being connected to the one surface;

a coil unit disposed within the body;

slit portions disposed in edges at which the one surface of the body meets the opposite end surfaces of the body, respectively;

first and second external electrodes disposed on the opposite end surfaces of the body, each thereof being connected to the coil unit, and extending to the one surface of the body through the slit portions, respectively; and a cover insulating layer covering each of the first and second external electrodes disposed on the opposite end surfaces of the body and on the slit portions.

2. The coil component of claim 1, wherein the coil unit includes first and second lead-out portions extending from the opposite end surfaces of the body to be connected to the first and second external electrodes, respectively, and the slit portions are spaced apart from the first and second lead-out portions, respectively.

3. The coil component of claim 2, wherein each of the slit portions has an inner wall and a lower surface, and a mean depth from the one surface of the body to the lower surface of the slit portion is 30 μm or more and 80 μm or less.

4. The coil component of claim 1, wherein each of the slit portions has an inner wall and a lower surface, and a mean depth from the one surface of the body to the lower surface of the slit portion is 30 μm or more and 80 μm or less.

5. The coil component of claim 4, wherein the coil unit is a wire-wound type coil.

6. The coil component of claim 1, wherein each of the first and second external electrodes includes a connection portion connected to the coil unit on each of the opposite end surfaces of the body, and a pad portion extending from the connection portion to the one surface of the body, and each of the connection portion and the pad portion includes a first metal layer.

7. The coil component of claim 6, wherein the first metal layer of the connection portion and the first metal layer of the pad portion are integrally formed.

8. The coil component of claim 6, wherein the pad portion further includes a second metal layer disposed on the first metal layer.

9. The coil component of claim 8, wherein the pad portion further includes a third metal layer disposed on the second metal layer.

10. The coil component of claim 9, wherein a portion of the third metal layer is disposed on the cover insulating layer.

11. The coil component of claim 8, wherein, along a thickness direction of the coil component, the first metal layer disposed on at least one of the slit portions overlaps the cover insulating layer and the second metal layer, in order.

12. The coil component of claim 8, wherein a portion of the second metal layer is disposed on the cover insulating layer.

13. The coil component of claim 6, wherein the cover insulating layer includes a first region covering the first metal layer disposed on each of the opposite end surfaces of the body, and a second region covering the first metal layer disposed on each of the slit portions, and a mean thickness CT2 of the cover insulating layer in the second region is larger than a mean thickness CT1 of the cover insulating layer in the first region.

14. The coil component of claim 1, further comprising a surface insulating layer covering regions in which the first and second external electrodes are not disposed on surfaces of the body.

15. The coil component of claim 14, wherein the body further has the other surface facing the one surface, and the coil component further comprises recess portions disposed at edges at which the other surface of the body meets the opposite end surfaces of the body, respectively.

16. The coil component of claim 15, wherein at least portions of the surface insulating layer are disposed in the recess portions.

17. The coil component of claim 1, further comprising a substrate disposed within the body, with the coil unit being disposed on at least one surface thereof, wherein a side surface of the substrate contacts each of the first and second external electrodes.

18. The coil component of claim 1, wherein the coil unit is a wire-wound type coil.

19. The coil component of claim 1, wherein each of the slit portions has an inner wall and a lower surface, and a mean depth from the one surface of the body to the lower surface of the slit portion is more than 29 μm and 82 μm or less.

* * * * *